United States Patent [19]

Larson

[11] 4,332,215
[45] Jun. 1, 1982

[54] MILKING INFLATION

[75] Inventor: Leigh R. Larson, Johnson Creek, Wis.

[73] Assignee: Hi-Life Rubber, Inc., Johnson Creek, Wis.

[21] Appl. No.: 192,897

[22] Filed: Oct. 1, 1980

[51] Int. Cl.³ .............................................. A01J 5/04
[52] U.S. Cl. ................................................. 119/14.49
[58] Field of Search ............... 119/14.47, 14.48, 14.49, 119/14.5, 14.51, 14.52, 14.53

[56] References Cited

U.S. PATENT DOCUMENTS

| | | | |
|---|---|---|---|
| 1,935,184 | 11/1933 | Hapgood | 119/14.49 |
| 2,120,556 | 6/1938 | Greene | 119/14.49 |
| 2,649,073 | 8/1953 | Smith | 119/14.47 X |
| 3,659,557 | 5/1972 | Noorlander | 119/14.36 |
| 3,696,790 | 10/1972 | Albright | 119/14.47 |
| 4,116,165 | 9/1978 | Arrington | 119/14.47 |
| 4,141,319 | 2/1979 | Maier et al. | 119/14.47 |

Primary Examiner—Gene Mancene
Assistant Examiner—Robert P. Swiatek
Attorney, Agent, or Firm—Michael, Best & Friedrich

[57] ABSTRACT

The expansion ring type milking inflation is formed from an elastomeric material and has a tapered upper end portion which serves as a mouthpiece for receiving cow's teat. The upper end portion includes an expansion ring-receiving portion adjacent the juncture with the main body and terminates in a rounded bead which defines a circular opening or mouth when the expansion ring is inserted. The upper end portion also includes an annular web section of reduced wall thickness adjacent the bead which serves to reduce transmissions of distortions caused by swelling to the bead and a plurality of circumferentially-spaced, reinforcement ribs formed integrally with and extending longitudinally between the expansion ring-receiving portion and the bead and also formed integrally with and projecting radially outwardly from the web section.

3 Claims, 5 Drawing Figures

MILKING INFLATION

BACKGROUND OF THE INVENTION

This invention relates to teat cup assemblies for vacuum operated milking machines and, more particularly, to liners or inflations for teat cup assemblies of the type which are expanded at one end by insertion of an annular rigid expansion ring to form a diaphragm or mouthpiece including a central opening for receiving the teat of a cow.

The above type milking liner or inflation is usually formed from an elastomeric material, such as a natural or synthetic rubber composition. The teat-receiving end portion is expanded or stretched by the expansion ring through the useful life of the inflation. Repeated contact of the teat-receiving end portion of the inflation with rubber swelling substances on cows' teats, plus stretching when the mouthpiece opening is pushed sideways by a cow's teat, distorts the shape of the mouthpiece opening (out of round) so it no longer properly engages the teat. The misshapen hole permits undesirable amounts of air to enter the inflation during milking, resulting in excessive vacuum loss, slurping, inflation slippage and drop off.

Representative prior expansion ring type milking inflations designed to minimize fatigue during the use are disclosed in U.S. Pat. Nos. 2,120,556 (Greene), issued Aug. 20, 1936, 3,659,557 (Noorlander), issued May 2, 1972 and 4,116,165 (Arrington), issued Sept. 26, 1978. The Greene patent discloses an inflation including a bulbous enlargement for receiving the expansion ring. The Noorlander patent discloses forming the teat-receiving portion of the inflation with a plurality of longitudinally extending corrugations which cause the central opening to be undulated when an expansion ring is inserted. The Arrington patent discloses making the teat-receiving end portion tapered with the wall thickness decreasing along the taper.

Attention is also directed to U.S. Pat. Nos. 3,696,790 (Albright), issued Oct. 10, 1972, and 4,141,319 (Maier et al), issued Feb. 27, 1979. FIGS. 13 and 16 of the Albright patent illustrate an inflation having a teat-receiving portion including a plurality of radially extending corrugations and a circumferentially extending corrugation which respectively spread and squeeze when a teat is inserted into the central opening. FIGS. 4 and 5 of the Maier et al patent illustrate an inflation having a plurality of radially extending ribs which terminate short of the central opening and serve to support the radial tension applied on the edge of the central opening during use.

None of the above patents disclose an expansion ring type inflation arranged in a manner to isolate the mouthpiece opening from the effects of swelling which can cause distortion in the shape and size of the opening.

SUMMARY OF THE INVENTION

One of the principal objects of the invention is to provide an expansion ring type milking inflation having an improved capability for the mouthpiece opening to retain its original shape and size during use.

Another of the principal objects of the invention is to provide an expansion ring type milking inflation including a teat-receiving end portion which terminates in a rounded bead defining a teat-receiving opening and is arranged to isolate the bead from distortions caused by swelling.

Other objects, aspects and advantages of the invention will become apparent to those skilled in the art upon reviewing the following description, the drawing and the appended claims.

The expansion ring type milking inflation of the invention is formed as a generally cylindrical, tubular member from an elastomeric material and has a tapered upper end portion which serves as a diaphragm or mouthpiece for receiving a teat of a cow when an annular rigid expansion ring is inserted. The upper end portion includes an inner wall of decreasing inside diameter and terminates in a rounded bead defining a circular central mouth for receiving a teat when the expansion ring is inserted, an annular expansion ring-receiving portion adjacent the juncture of the tapered upper end portion and a main body portion, an annular web section of reduced wall thickness adjacent and formed integrally with the bead, and a plurality of circumferentially spaced ribs formed integrally with and extending longitudinally between the expansion ring-receiving portion and the bead and also formed integrally with and projecting radially outwardly from the web section.

The thinner, more flexible web section tends to effectively absorb distortions caused by swelling of the elastomeric material upon exposure to fats and ointments on cows' teats during use and thereby minimizes distortions transmitted to the bead. The ribs in cooperation with the bead reinforce the web section and add stiffness for enhancing the ability of the mouth defined by the bead to retain its original shape and hole diameter.

The wall thickness of the web section preferably is substantially constant and about 25 to about 65% of the wall thickness of the main body portion. The ribs preferably have a uniform height and the distance between the inside surface of the inner wall and the outer edge of the ribs preferably is slightly greater than the wall thickness of the main body portion.

DESCRIPTION OF THE PREFERRED EMBODIMENT

Figure 2:
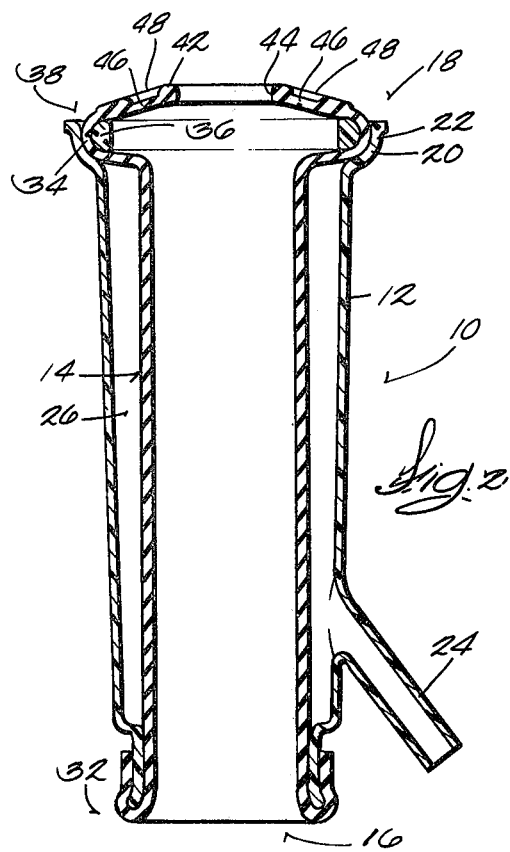
FIG. 2 is a sectioned, elevation view of a teat cup assembly including a milking inflation of the invention.

Illustrated in FIG. 2 is a teat cup assembly 10 including a rigid, generally cylindrical outer shell 12 which surrounds and supports a liner or inflation 14. The shell 12 is formed from a transparent material, such as a synthetic thermoplastic or thermosetting resin, or from a metal, such as stainless steel. The shell 12 has a bottom opening 16 and an open upper end 18 including a radially outwardly extending, peripheral flange or ledge 20 and an upwardly extending rim 22 which cooperate to form a seat for the upper end portion of the inflation 14 as described below.

Located in the side of the shell 12 is a nipple 24 which is connected in communication with a suitable pump and valve (not shown) for providing a pulsating vacuum in the chamber 26 defined between the interior wall of the shell 12 and the inflation 14 to alternately contract and expand the inflation.

Figure 1:
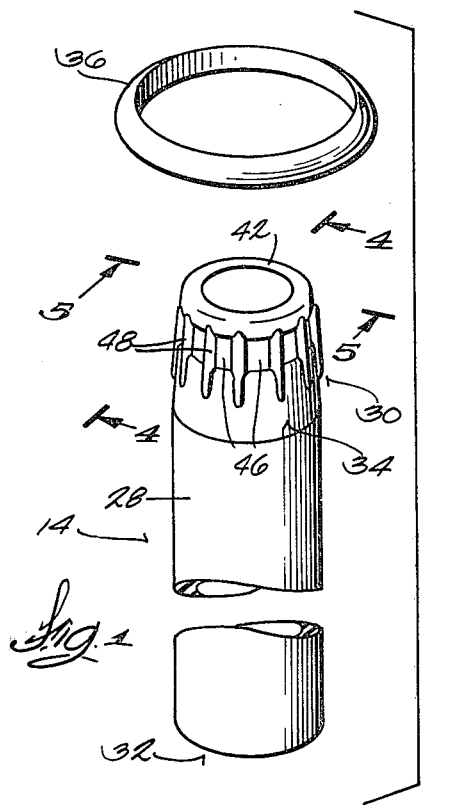
FIG. 1 is an exploded, fragmentary, perspective view of a milking inflation of the invention and an expansion ring, shown prior to insertion of the expansion ring and installation into a teat cup assembly.

As best shown in FIG. 1, the inflation 14 is a generally cylindrical, tubular member molded from an elastomeric material, preferably a synthetic or natural rubber composition including curing agents and the like. The inflation 14 has an elongated, cylindrical body portion 28, a tapered upper end portion 30 formed integrally with the body portion 28, and a lower end portion 32 stretched over the bottom opening 16 of the shell 12. The lower end portion of the inflation 14 is connected to a milking machine claw (not shown) in a conventional manner through another tubular part of elastomeric material. If desired, the lower end portion of the inflation 14 can be arranged to extend through the bottom opening 16 of the shell 12 and be connected directly to the milking machine claw.

Figure 3:
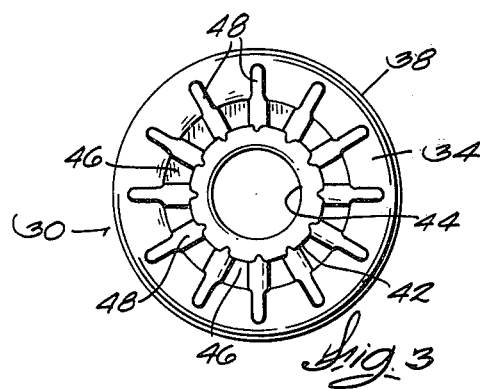
FIG. 3 is a top plan view of the milking inflation illustrated in FIG. 2.
Figures 4, 5:
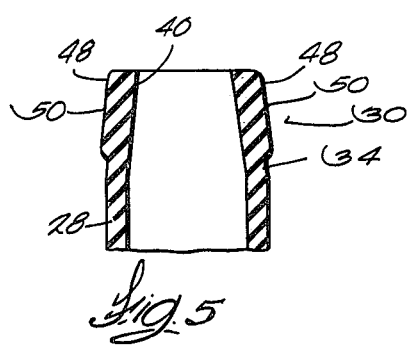
FIG. 4 is a sectional view taken generally along line 4—4 in FIG. 1.
FIG. 5 is a sectional view taken generally along line 5—5 in FIG. 1.

Located generally adjacent the juncture of the tapered upper end portion 30 and the body portion 28 of the inflation 14 is an expansion ring-receiving portion 34. When an annular, rigid expansion ring 36 is inserted into the end of the inflation 14 and positioned inside the expansion ring-receiving portion 34, the upper end of the inflation 14 is enlarged as shown in FIGS. 2 and 3. The thus-enlarged head 38 is adapted to sealingly seat on the shell ledge 20.

The body portion 28 of the inflation 14 has a substantially constant inside diameter (e.g., 0.817 inch) and a substantially constant wall thickness (e.g., 0.125 inch) along the length thereof. The expansion ring-receiving portion 34 preferably has a wall thickness substantially the same as the wall thickness of the body portion 28. The inside diameter of the inner wall 40 of the upper end portion 30 decreases along the length thereof.

The upper end portion 30 of the inflation 14 terminates in a smoothly rounded bead portion 42 which resembles an O-ring in shape and defines a central circular opening or mouth 44 for receiving a teat of a cow when the expansion ring 36 is inserted. The bead 42 reinforces the lip of the mouth 44 and increases the tendency for the mouth 44 to retain its original shape and diameter during use.

Disposed adjacent and formed integrally with the bead 42 is an annular web section 46 having a wall thickness substantially less than the wall thickness of the body portion 28 and the expansion ring-receiving portion 34. As mentioned above, the thinner, more flexible web section 46 absorbs distortions in the upper end portion 38 caused by swelling of the elastomeric material from exposure to fats and ointments on a cow's teat and by stretching during placement on a cow's teat, thereby minimizing distortions transmitted to the bead 42. To best serve this purpose, the wall thickness of the web section 46 preferably is about 25 to about 65%, most preferably about 50%, of the wall thickness of the body portion 28. For example, the web section 46 can have a wall thickness of 0.062 inch for inflations having a body thickness of 0.125 inch. The wall thickness of the web section 46 preferably is substantially uniform except for the edges adjoining the bead 42 and the expansion ring-receiving portion 34.

Formed integrally with and extending longitudinally between the expansion ring-receiving portion 34 and the bead 42 is a plurality of circumferentially-spaced ribs 48 which are also formed integrally with and project radially outwardly from the web section 46. The ribs 48 preferably are spaced at equal intervals and add stiffness for enhancing the ability of the mouth 44 defined by the bead 42 to retain its original shape and hole diameter. That is, the ribs 48 assist in minimizing the tendency for the mouth 44 to assume a corrugated shape (with respect to its normal plane) or to become oblong.

The height and width of the ribs 48 can be varied so long as the web section 46 remains flexible enough to absorb distortions transmitted to the bead 42. The distance between the inside surface of the inner wall 40 and the outer edge 50 of the ribs 48 preferably is slightly greater than the wall thickness of the body portion 28. For example, this distance can be 0.133 for inflations having a body thickness of 0.125 inch.

As best shown in FIG. 3 the upper end portion 30 has an appearance resembling a spoked wheel after the expansion ring 36 is inserted.

From the foregoing description, one skilled in the art can easily ascertain the essential characteristics of this invention and, without departing from the spirit and scope thereof, make various changes and modifications to adapt it to various usages.

I claim:

1. An expansion ring type inflation for a teat cup assembly of a milking machine including a rigid, generally cylindrical, outer shell having an enlarged peripheral ledge at one end, said inflation being formed as a generally cylindrical, tubular member from an elastomeric material and including a main body portion, a tapered upper end portion formed integrally with said main body portion, said upper end being adapted to seat against the shell ledge after insertion of a rigid expansion ring and characterized by:
    (a) an inner wall of decreasing inside diameter and terminating in a thickened rounded bead which defines a circular central mouth for receiving a teat of a cow when the expansion ring is inserted;
    (b) an annular expansion ring-receiving portion adjacent the juncture of said upper end portion with said main body portion and having a wall thickness substantially the same as said main body portion;
    (c) an annular web section of reduced wall thickness formed integrally with said bead and extending longitudinally therefrom toward said expansion ring-receiving portion, said web section having a substantially uniform wall thickness which is about 25 to about 65% of the wall thickness of said main body portion; and
    (d) a plurality of circumferentially-spaced ribs formed integrally with and extending longitudinally between said expansion ring-receiving portion and said bead and also formed integrally with and projecting radially outwardly from said web section.

2. An inflation according to claim 1 wherein the distance between the outer edge of said ribs and said inner wall is slightly greater than the wall thickness of said main body portion.

3. An inflation according to claim 1 wherein the wall thickness of said web section is about 50% of the wall thickness of said main body portion.

* * * * *